United States Patent
Tapia (10) Patent No.: US 12,196,844 B2
(45) Date of Patent: Jan. 14, 2025

(54) RADAR INTERFERENCE DETECTION AND MITIGATION

(71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 356 days.

(21) Appl. No.: 17/659,426

(22) Filed: Apr. 15, 2022

(65) Prior Publication Data

US 2023/0333232 A1     Oct. 19, 2023

(51) Int. Cl.
 - *G01S 13/34* (2006.01)
 - *G01S 13/79* (2006.01)
 - *G01S 13/90* (2006.01)
 - G01S 13/931 (2020.01)

(52) U.S. Cl.
 CPC ............ *G01S 13/346* (2013.01); *G01S 13/79* (2013.01); *G01S 13/9023* (2013.01); *G01S 13/931* (2013.01)

(58) Field of Classification Search
 CPC .... G01S 13/346; G01S 13/79; G01S 13/9023; G01S 7/0232; G01S 7/0236; G01S 7/417; G01S 13/931; G01S 7/023
 See application file for complete search history.

(56) References Cited

U.S. PATENT DOCUMENTS

| | | | | |
|---|---|---|---|---|
| 2010/0066586 A1* | 3/2010 | Liu | ........................... | G01S 3/74 342/33 |
| 2011/0291875 A1* | 12/2011 | Szajnowski | ............. | G01S 13/34 342/70 |
| 2016/0033622 A1* | 2/2016 | Martone | .................. | G01S 7/412 342/18 |

(Continued)

OTHER PUBLICATIONS

Inverse synthetic aperture radar imaging of maneuvering targets based on chirplet decomposition. Authors: Genyuan Wang, Zheng Bao. Xidian University, Laboratory of Radar Signal Processing (Year: 1999).*

*Primary Examiner* — Timothy A Brainard
*Assistant Examiner* — Ismaaeel A. Siddiquee
(74) *Attorney, Agent, or Firm* — Michael DiCato (57) ABSTRACT

Architectures and techniques for radar interference detection are provided. A radar sensor system in accordance with the present disclosure may receive, via a radio frequency (RF) receiver, radar signals including a radar signal of interest and one or more interfering radar signals. The radar sensor system may calculate a Doppler spectrum for each of the radar signals and perform a chirplet transform on the Doppler spectrum to generate various waveform parameters. A Principal Component Analysis (PCA) may be performed on the waveform parameters to extract frequency features of the radar signals. The radar sensor system may classify the frequency features using a classifier to identify interfering frequency features associated with the interfering radar signals using a classifier. The radar sensor system may (Continued)

further extract interfering waveform information based on the interfering frequency features of the interfering RF signals. Interference mitigation may be performed utilizing the interfering waveform information.

17 Claims, 7 Drawing Sheets

(56) References Cited

U.S. PATENT DOCUMENTS

2019/0041492 A1* 2/2019 Paradie ............... G01S 7/023
2020/0124699 A1* 4/2020 Meissner ............ G01S 13/0209
2021/0373127 A1* 12/2021 Slobodyanyuk ........ G06F 17/16

* cited by examiner

INSTRUCTIONS TO CALCULATE A DOPPLER SPECTRUM 521

INSTRUCTIONS TO PERFORM A CHIRPLET TRANSFORM TO EXTRACT VARIOUS EXTRACT WAVEFORM PARAMETERS 523

INSTRUCTIONS TO PERFORM PCA ON THE WAVEFORM PARAMETERS 525

INSTRUCTIONS TO EXTRACT A PLURALITY OF FREQUENCY FEATURES OF THE ONE OR MORE RF SIGNALS 520

FIG. 6

RADAR INTERFERENCE DETECTION AND MITIGATION

BACKGROUND

Many vehicles are equipped with radar systems for driving assistance and safety. For example, an automotive radar system may transmit a signal in which the frequency varies over time (a chirp). After free space propagation, return echoes may be collected by an antenna and demodulated by the automotive radar system. The automotive radar system may mix the wave reflected from an object with a replica of the transmitted signal results in a continuous wave signal with a frequency that represents the distance between the radar transmitter/receiver and the object. However, the detection capacity of the automotive radar may be compromised by the interference caused by other radar systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure provides for mechanisms for radar interference detection and mitigation. The components and techniques described herein can be used, for example, with an automobile for radar interference detection and mitigation.

A vehicle may be equipped with a radar system that may transmit radio signals and listen for the reflection of the radio signals from objects in the scan area of the radar system. For example, the radar system may transmit a frequency-modulated continuous waveform (FMCW) radar signal (e.g., by modulating a chirp signal with a carrier signal) and may collect radar echoes using an antenna. However, utilizing such a modulation schema to implement a radar system may cause interference between radar systems. For example, the collected radar echoes may include FMCW radar signals transmitted from other radar systems (e.g., radar systems installed on other vehicles). Current automotive radar systems have limited capabilities of detecting such interference and taking effective countermeasures.

In the examples that follow, a radar signal processing chain may utilize a chirplet transform to extract various waveform parameters of radar signals received via a receiver of a radar system. The radar signals may include a radar signal transmitted from the radar system (the "radar signal of interest") and one or more interfering radar signals (i.e., radar signals transmitted from one or more other radar systems). A Principal Component Analysis (PCA) engine may perform PCA on the waveform parameters to extract frequency features of the radar signals. A classifier may classify the frequency features to identify interfering frequency features associated with the interfering radar signals using a classifier. The radar signal processing chain may further extract interfering waveform information of the interfering RF signals. The detected interference may be mitigated utilizing the interfering waveform information.

By using both the decomposed chirp information and its PCA representation as frequency features, the mechanisms described herein may differentiate signals highly similar to the radar signal of interest irradiated by the radar system. Unlike current approaches that operate with a limited and fixed set of mitigation strategies, the mechanisms described herein may produce extra interfering waveform information that can be used to determine a customized interference mitigation strategy.

Figure 1:
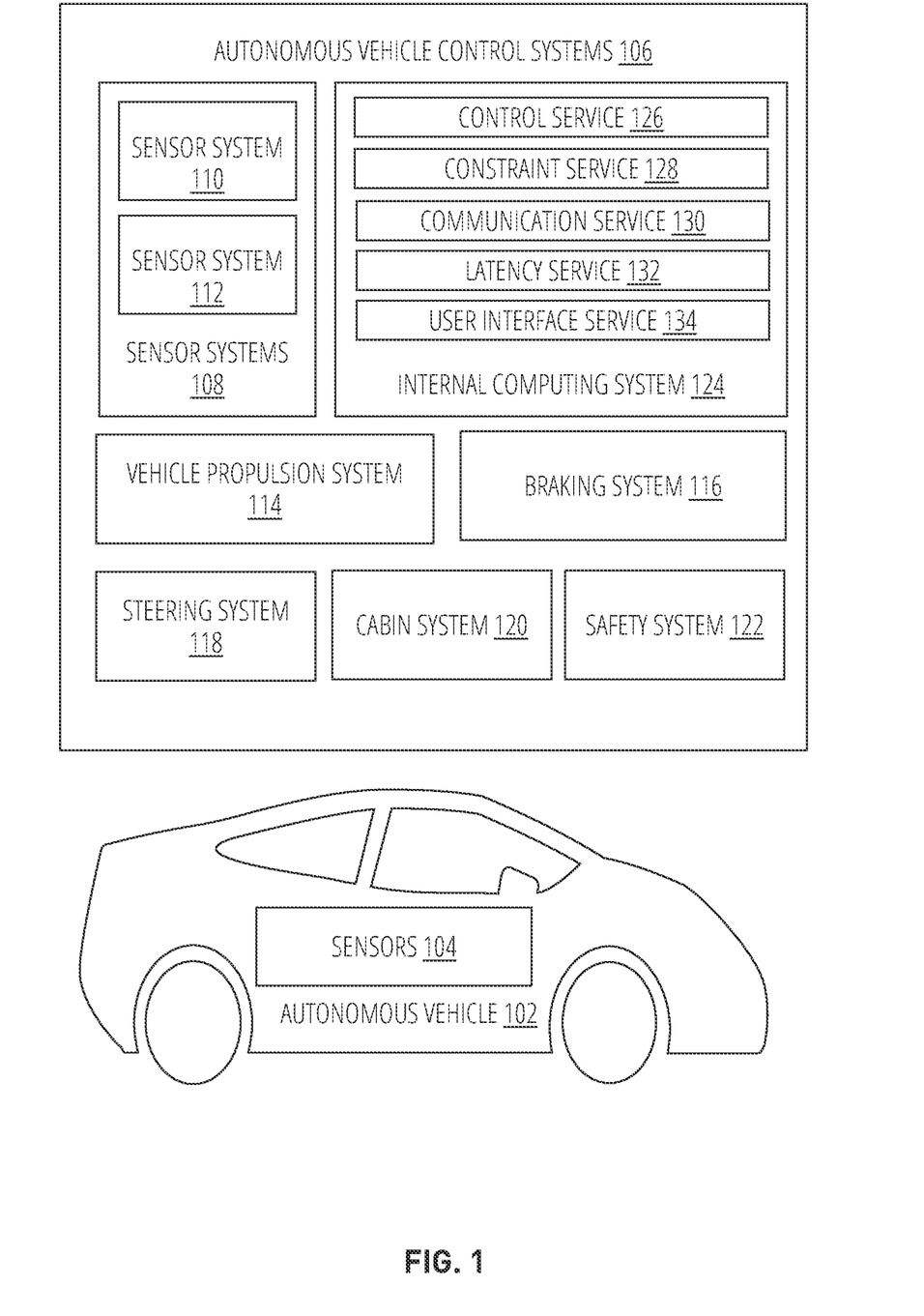
FIG. 1 is a block diagram of an example autonomous vehicle.

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 102 can further include mechanical systems to control and manage operation of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. In the examples that follow, safety system 122 can include a waveform sensing, amplification and repeating system that can provide early warning functionality. In the examples that follow, safety system 122 can function to modify received radar signals that have been transmitted by other vehicles.

Automobiles can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems typically operate in the 77 GHz band (e.g., 76-81 GHz). SRR systems can be used, for example, for blind spot detection or collision avoidance. SRR systems typically operate in the 24 GHz band. MRR systems can operate in either the 24 GHz band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120, safety system 122). Internal computing system 124 includes at least one processor and at least one memory system that can store executable instructions to be executed by the processor. Internal computing system 124 can include any number of computing sub-systems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132, user interface service 134) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132, user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup, dropoff), etc.

Figure 2:
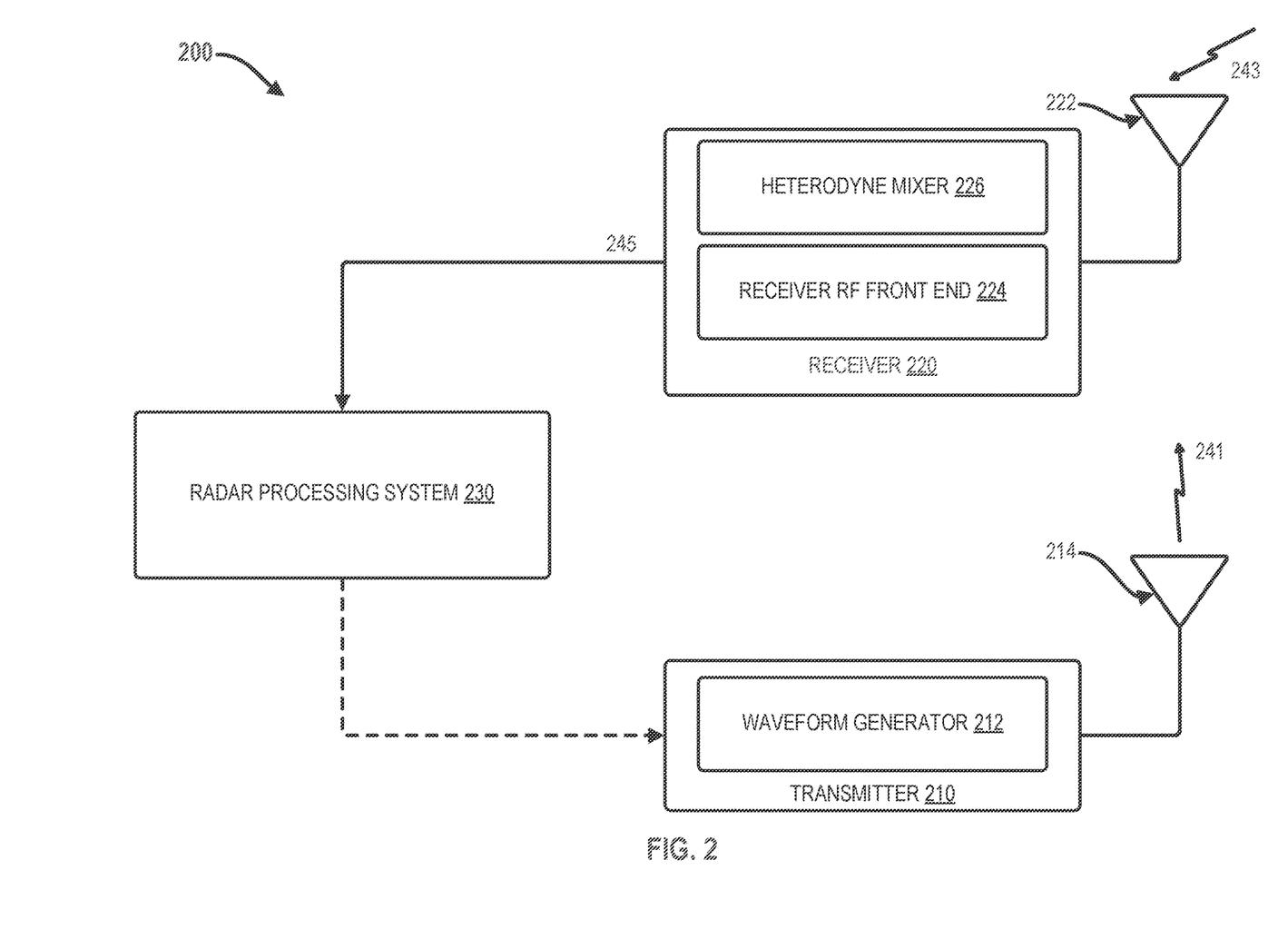
FIG. 2 a block diagram of an example radar sensor system.

FIG. 2 is a block diagram of an example radar sensor system 200. The radar sensor system of FIG. 2 can be within, for example, an autonomous vehicle (e.g., autonomous vehicle 102). In other configurations, the radar sensor system can be part of a different environment.

A transmitter 210 of the radar sensor system 200 may transmit a radar signal 241. For example, a waveform generator 212 may generate the radar signal 241 by generating a baseband signal and modulating the baseband signal with a carrier signal. The baseband signal may be a chirp signal in which the frequency varies over time. The radar signal 241 may be transmitted through free space via antenna(s) 214 and may be reflected by one or more objects (not shown) in a scan area of the radar sensor system 200. The reflected radar signal may be received by receiver 220 via receiver antenna 222.

Receiver 220 can receive radar signals 243 via receiver antenna 222. The received radar signal 243 may correspond to radar echoes from the scan area and may include one or more RF signals. The received radar signals 243 may include the reflected radar signal 241 (also referred to as the "radar signal of interest"). The received radar signals 243 may also include one or more radar signals transmitted from one or more other radar systems (also referred to as the "interfering radar signals"), such as radar signals transmitted from an AV or radar signals from a vehicle having an ADAS that is not associated with the radar sensor system 200.

RF receiver front end 224 can perform any signal conditioning operations on the radar signals 243 for the processing operations that follow. In some embodiments, the received radar signals 243 may be converted from a first frequency range to a corresponding lower-frequency signal in a second frequency range by, for example, a heterodyne mixer 226. In one example, the first frequency range can correspond to an automotive radar range. In other examples, different frequency ranges can be supported. Various frequency ranges can be supported for the lower-frequency signal. In one example, the second frequency range can be 20 MHz to 100 MHz. As another example, the second frequency range can be 20 MHz to 4 GHz.

Receiver 220 may send the processed and downconverted radar signals (RF signals 245) to radar processing system 230 for further processing. For example, radar processing system 230 may extract frequency features of the RF signals 245 and may classify the frequency features into interfering frequency features corresponding to the interfering radar signals and frequency features corresponding to the radar signal 241. As such, radar processing system 230 may differentiate the radar signal 241 from the interfering signals. To extract the frequency features, radar processing system 230 may calculate the Doppler spectrum of each of the RF signals 245 and may extract waveform parameters utilizing a chirplet transform. Radar processing system 230 may then perform PCA on the results of the chirplet transform. Radar processing system 230 may further extract interfering waveform information of the interfering radar signals (e.g., phase noise). In some embodiments, the interfering waveform information may be provided to the transmitter 210 and/or the waveform generator 212 for interference mitigation. As an example, the transmitter 210 may be reconfigured to avoid future interference from the interfering radar signals (e.g., by changing the operating frequency of the transmitter 210). Radar processing system 230 may implement the radar sensor processing chain as described in connection with FIGS. 3 and 4.

Figure 3:
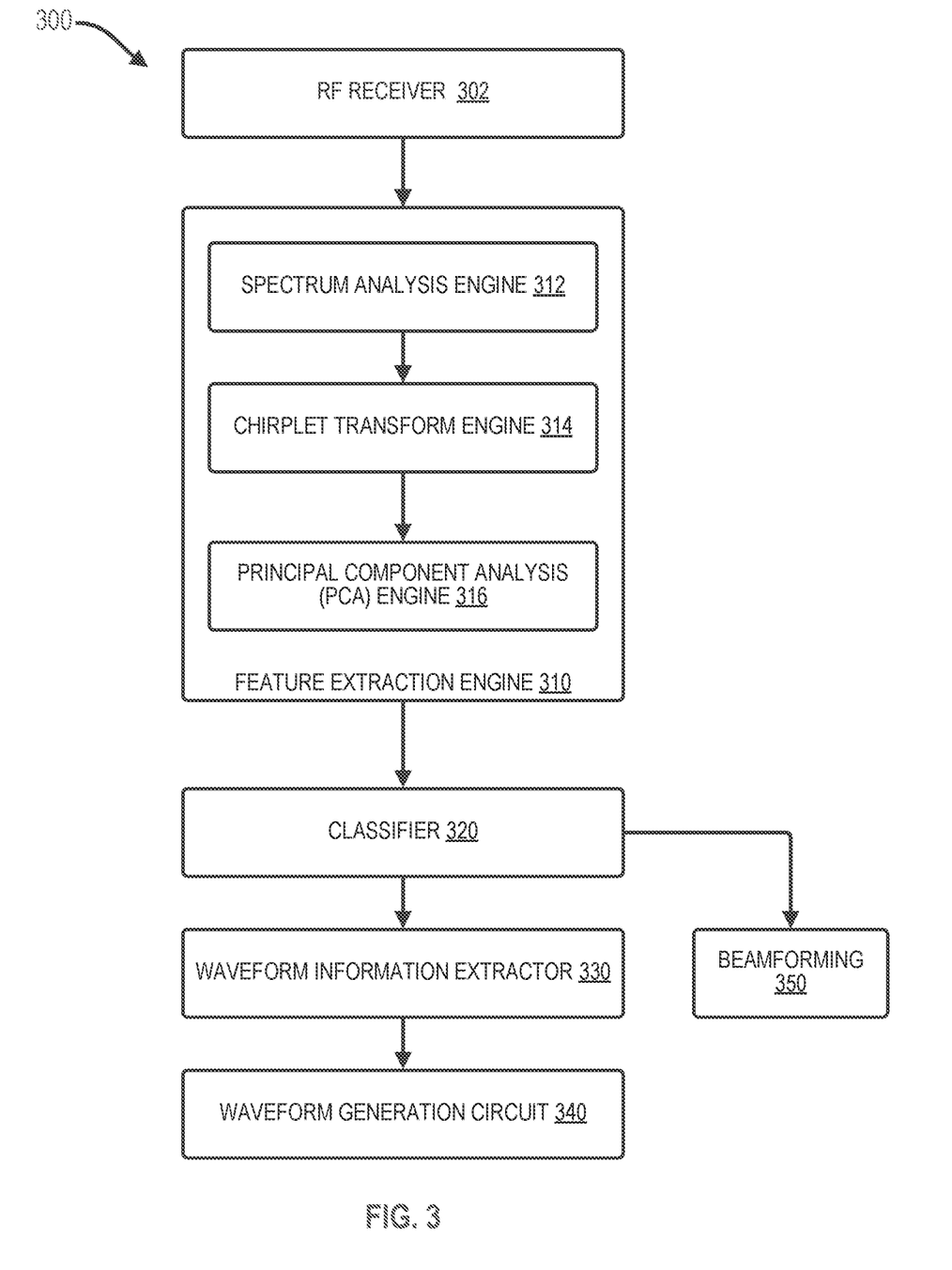
FIG. 3 is a conceptual diagram of an example radar sensor processing chain.
Figure 4A:
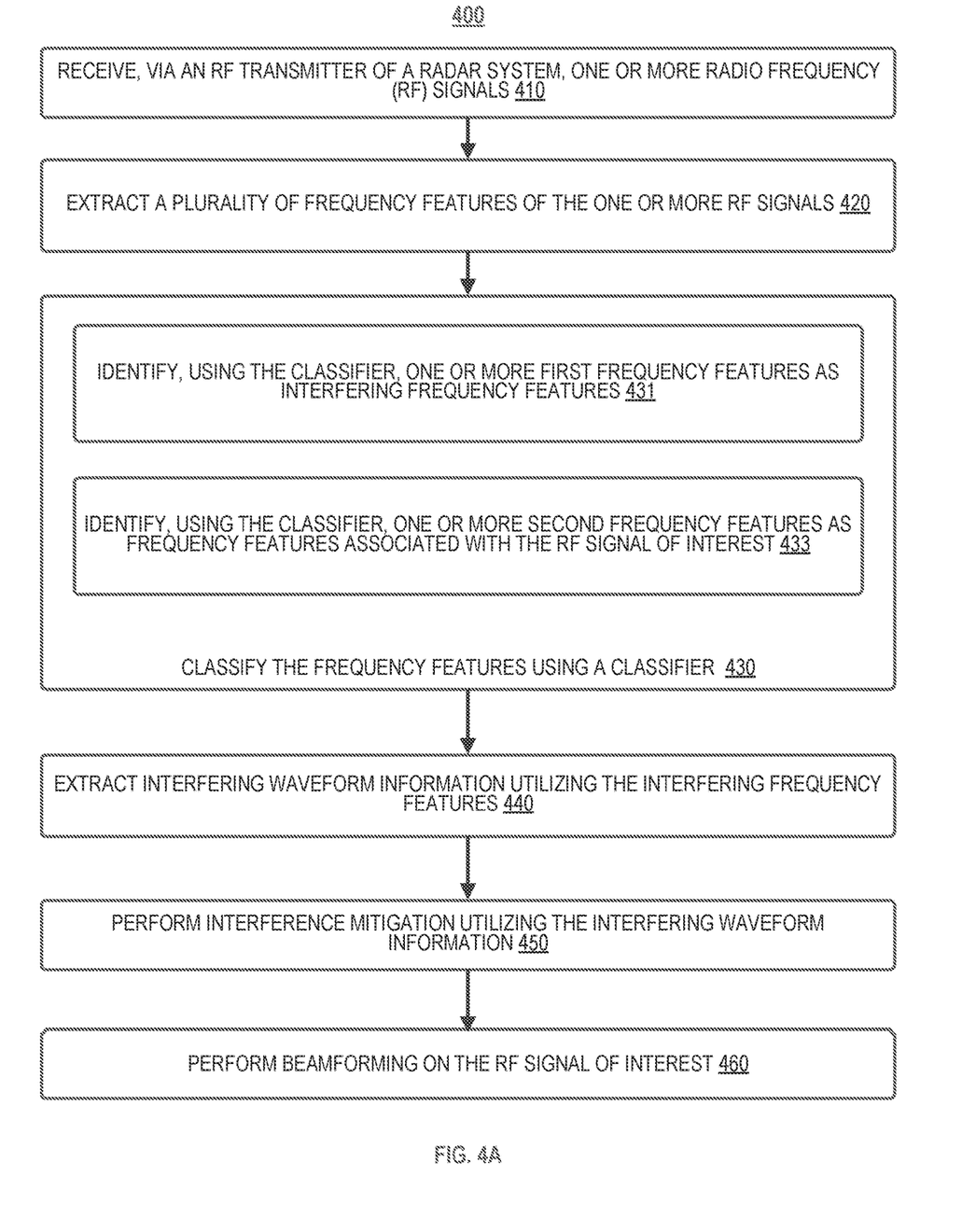
FIG. 4A is a flow diagram illustrating one example technique for detecting and mitigating interference for a radar sensor system.

FIG. 3 is a conceptual diagram of an example radar sensor processing chain 300. In one example, components that provide the functionality described with respect to FIG. 3 can be part of an autonomous vehicle (e.g., autonomous vehicle 102), or can be part of a vehicle having ADAS functionality. The processing chain of FIG. 3 can function within, for example, the radar sensor system of FIG. 2 and/or within autonomous vehicle 102.

When in an operational state, RF receiver 302 can receive one or more radar signals. Each of the radar signals may be an RF signal. In some embodiments, the radar signals include a plurality of FMCW radio signals. The received radar signals may correspond to radar echoes from the scan area. The received radar signals may include a radar signal of interest and one or more interfering radar signals. The radar signal of interest may correspond to radar echoes of an RF signal transmitted from a transmitter associated with the RF receiver 302. The interfering radar signals may correspond to radar echoes of RF signals transmitted from one or more radar transmitters that are not associated with the RF receiver 302. RF receiver 302 can perform any signal conditioning operations for the processing operations that follow.

Feature extraction engine 310 may extract frequency features of the received radar signals. For example, spectra analysis engine 312 may generate a Doppler spectrum from each of the received radar signals. A Doppler spectrum of a radar signal may be a power weighted distribution of Doppler velocities within the radar resolution volume. The Doppler spectrum may be calculated using any suitable technique that can produce Doppler velocities and/or the Doppler spectrum.

Chirplet transform engine 314 may perform a chirplet transform on each Doppler spectrum to calculate various waveform parameters. In one example, the waveform parameters can include chirp rate, start frequency, end frequency, time delay for each received radar signal, pulse repetition frequency, phase offset, etc. In alternate examples, additional and/or different waveform parameters can be determined.

The results from the chirplet transform and the waveform parameters may be provided to a principal component analysis (PCA) engine 316. The PCA engine 316 may perform a PCA on the waveform parameters. For example, the PCA engine 316 may generate one or more covariance matrices based on the waveform parameters. The principal components may be computed by eigendecomposition of the data covariance matrix or singular value decomposition of the data matrix. In some embodiments, the eigenvectors of the covariance matrices may be determined and used as the principal components of the waveform parameters. The eigenvectors may be used as the frequency features of the received radar signals.

The frequency features may be provided to a classifier 320 for classification. For example, the classifier 320 may classify each of the frequency features as a frequency feature associated with the radar signal of interest or a frequency feature associated with an interfering radar signal (also referred to as the "interfering frequency feature"). A received radar signal associated with the interfering frequency features may be regarded as being the interfering radar signal. A received radar signal associated with a frequency feature that is not classified as an interfering frequency feature may be regarded as being the radar signal of interest. The classifier 320 may be trained using training data including known frequency features and corresponding classification results (e.g., a classification result corresponding to "interfering frequency feature" or a classification result corresponding to "frequency feature of the radar signal of interest"). The classifier 320 may include any suitable classifier that is capable of making a binary decision. In some embodiments, the classifier 320 may be and/or include a nonlinear classifier, such as a k-nearest-neighbors (KNN), a kernel support vector machine (SVM), etc.

Waveform information extractor 330 may determine interfering waveform information. The interfering waveform information may include one or more parameters of the interfering radar signal(s), such as phase, frequency change rate, bandwidth, etc. As an example, waveform information extractor 330 may obtain waveform characteristics by performing the following time frequency analysis operation:

$$R(t,\alpha,f,\varphi,\theta,\mu,\vartheta)=s(t,\theta,\vartheta)*c(t,\alpha,f_{start},f_{end},\varphi), \tag{1}$$

where $s(t, \theta, \vartheta)$ denotes the downconverted radar signals (e.g., RF signals 245), $c(t, \alpha, f_{start}, f_{end}, \varphi)$ is the chirplet kernel, * is the convolution operator, t is fast time, $\alpha$ is the chirprate, $f_{start}$ is the chirplet start frequency, $f_{end}$ is the chirplet end frequency, $\varphi$ is the chirplet start phase offset, $\theta$ is the received azimuth location, and $\vartheta$ is the receiver elevation location. In some embodiments, waveform information extractor 330 may identify one or more of the waveform characteristics obtained utilizing equation (1) as being interfering waveform information in response to determining that the obtained waveform characteristics do not match known transmitter waveform characteristics (e.g., the waveform characteristics of the transmitter associated with RF receiver 302).

The interfering waveform information may be provided to a waveform generation circuit 340 for interference mitigation. As an example, the transmitter associated with the RF receiver 302 may be reconfigured to avoid future interference from the interfering radar signals (e.g., by changing the operating frequency of the transmitter). In some embodiments, any other suitable interference mitigation strategies may be applied. For example, the interfering radar signals may be filtered from the received radar signals for further processing.

In some embodiments, beamforming engine 350 can perform beamforming utilizing the frequency features that are not classified as interfering frequency features. For example, a received radar associated with the frequency features that are not classified as interfering frequency features may be identified as the radar signal of interest. Beamforming may be performed on the radar of interest.

FIG. 4A is a flow diagram of one example technique for detecting and mitigating interference for a radar sensor system. The following functionality 400 can be provided via, for example, the architectures of FIGS. 1-3.

In block 410, a radio frequency (RF) receiver (e.g., receiver 220 of FIG. 2) receives one or more radio frequency (RF) signals. In some embodiments, the RF receiver may further perform any signal conditioning operations for the processing operations that follow. The RF signals may include an RF signal of interest and one or more interfering RF signals. The RF signal of interest may correspond to radar echoes for a scan area transmitted from a radar signal transmitted from a transmitter associated with the RF receiver (e.g., transmitter 210 of FIG. 2). The interfering RF signals may correspond to radar echoes of the scan area transmitted from one or more radar signals transmitted from one or more other transmitters that are not associated with the RF receiver. In some embodiments, the transmitter associated with the RF receiver may be installed on a first vehicle. The transmitters that are not associated with the RF receiver may be installed on one or more other vehicles.

In block 420, one or more hardware processors may extract a plurality of frequency features of the one or more RF signals. The frequency features may be and/or include any suitable parameter that may represent the frequency information of the RF signals. In some embodiments, to extract the frequency features of the received RF signals, the hardware processor(s) may perform one or more operations depicted in FIG. 4B. For example, a Doppler spectrum may be calculated for each of the RF signals in block 421.

Figure 4B:
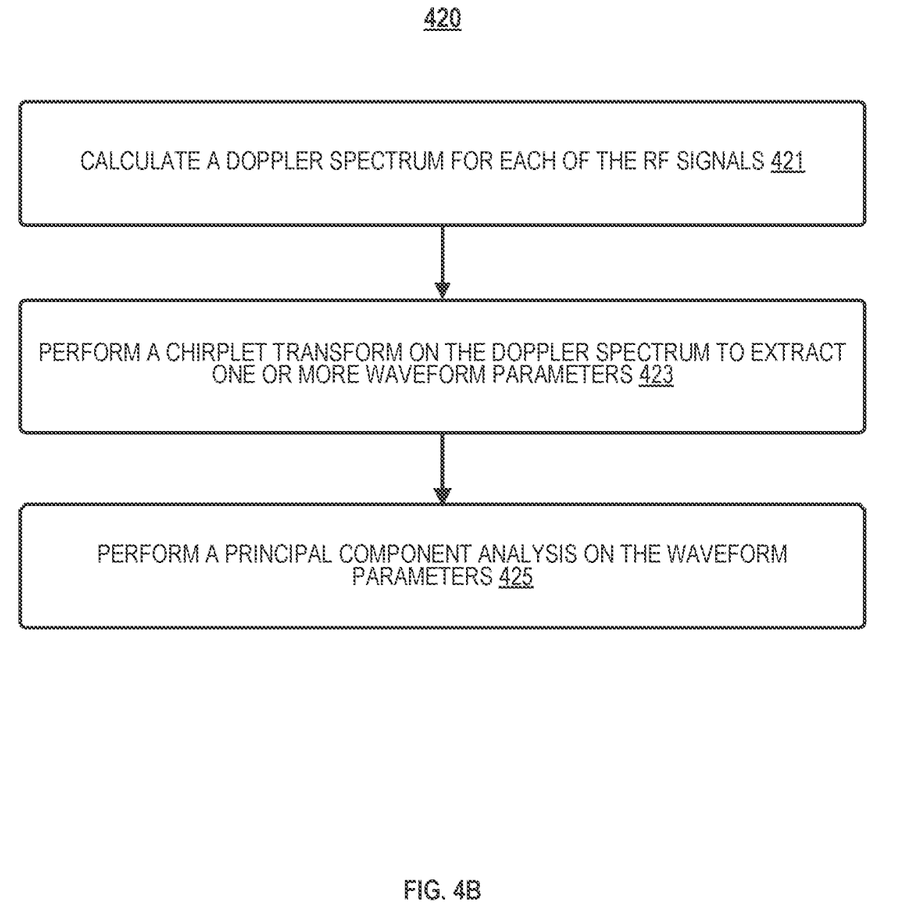
FIG. 4B is a flow diagram illustrating one example technique for extracting frequency features of RF signals.

In block 423, a chirplet transform may be performed on the Doppler spectrum of each of the RF signals to calculate one or more waveform parameters. Examples of the waveform parameters may include chirp rate, start frequency, end frequency, and time delay for each received radar signal.

In block 425, the hardware processor(s) may perform a principal component analysis on the waveform parameters. For example, the hardware processor(s) may generate one or more covariance matrices based on the waveform parameters. The principal components may be computed by eigen-decomposition of the data covariance matrix or singular value decomposition of the data matrix. The hardware processor(s) may use the principal components as the frequency features of the RF signals.

Referring back to FIG. 4A, in block 430, the hardware processor(s) may classify the frequency features into interfering frequency features of the interfering RF signals and frequency features of the RF signal of interest. For example, the classification may be performed using a classifier trained to classify an input frequency feature as an interfering frequency feature or a frequency feature of the RF signal of interest (e.g., classifier 320 of FIG. 3). The classifier may classify each of the frequency features as either an interfering frequency feature or a frequency feature of the RF signal of interest. In some embodiments, the hardware processor(s) may identify, using the classifier, one or more first frequency features of the plurality of frequency features as interfering frequency features of the interfering RF signals in block 431. The hardware processor(s) may identify, using the classifier, one or more second frequency features of the plurality of frequency features as frequency features of the RF signal of interest in block 433.

In block 440, the hardware processor(s) may extract interfering waveform information based on the interfering frequency features of the interfering RF signals. Examples of the interfering waveform information include phase, frequency change rate, bandwidth, etc. of the interfering RF signals. As an example, the hardware processor(s) may extract waveform characteristics by performing a time frequency analysis operation utilizing equation (1). In some embodiments, the hardware processor(s) may compare the extracted waveform characteristics with the waveform characteristics of the transmitter associated with the RF receiver and may identify the interfering waveform information by identifying the waveform characteristics that do not match the waveform characteristics of the transmitter associated with the RF receiver.

In block 450, the hardware processor(s) may perform interference mitigation based on the interfering waveform information. For example, the interfering RF signals may be filtered from the received RF signals for further processing. As another example, the hardware processor(s) may cause the transmitter associated with the RF receiver to be reconfigured to avoid future interference from the interfering RF signals. In one implementation, the hardware processor(s) may change the operating frequency of the RF transmitter (e.g., by determining a new operating frequency that may avoid the interference and provide the new operating frequency to the RF transmitter). In another implementation, the hardware processor(s) may send the interfering waveform information to the RF receiver and/or any other suitable device for interference mitigation.

In some embodiments, in block 460, beamforming may be performed utilizing the second frequency components associated with the RF signal of interest. For example, the RF signal of interest may be identified and passed to a radar beamforming chain for processing. The RF receiver and the transmitter associated with the RF receiver may be focused in a direction determined based on the second frequency components.

Figure 5:
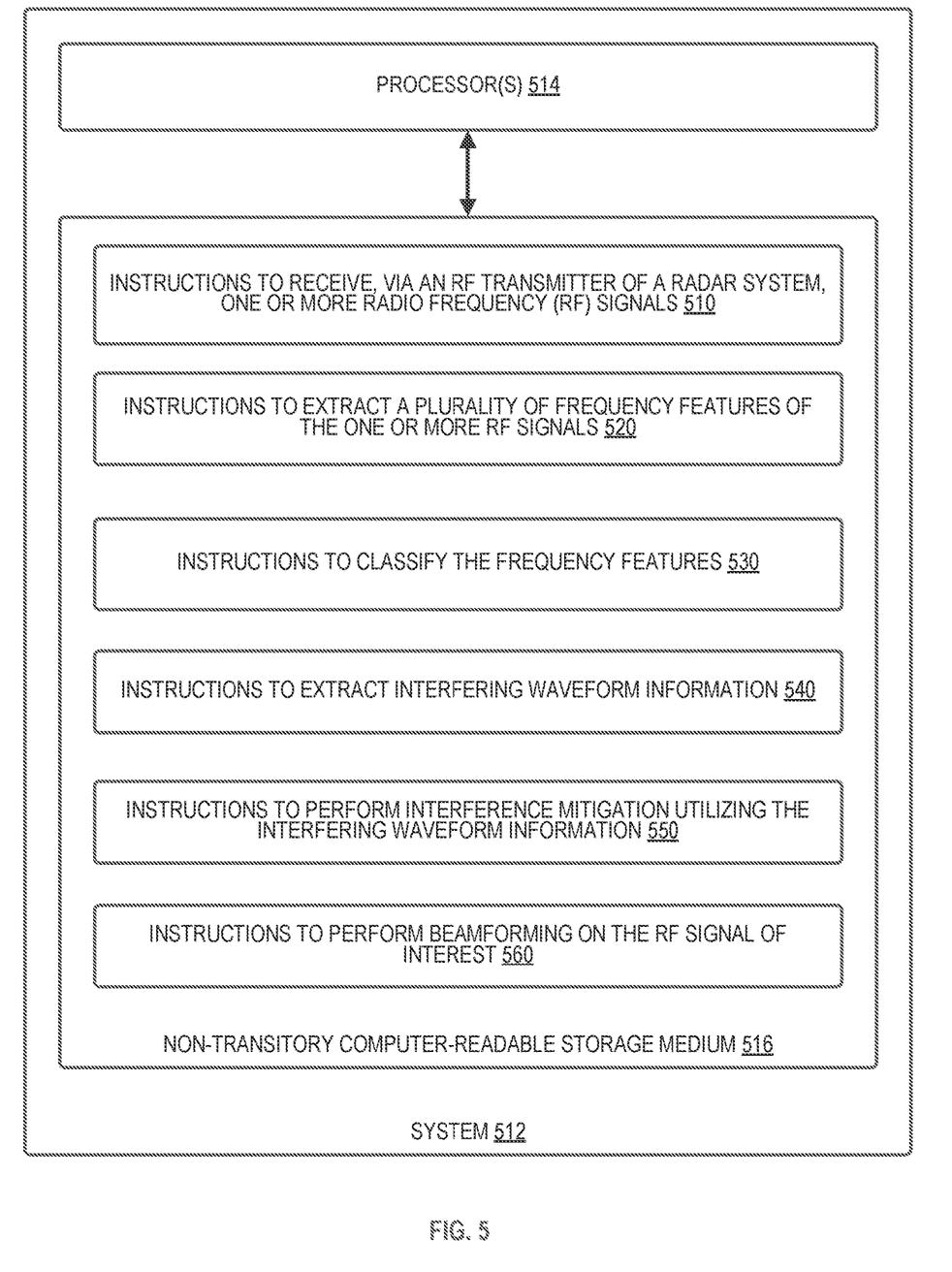
FIG. 5 is a block diagram of one example of a processing system for radar interference detection and mitigation.

FIG. 5 is a block diagram of one example of a processing system radar interference detection and mitigation. In one example, system 512 can be part of an autonomous vehicle (e.g., autonomous vehicle 102 as part of internal computing system 124) that utilizes various sensors including radar sensors. In other examples, system 512 can be part of a human-operated vehicle having an advanced driver assistance system (ADAS) that can utilized various sensors including radar sensors.

In an example, system 512 can include processor(s) 514 and non-transitory computer readable storage medium 516. Non-transitory computer readable storage medium 516 may store instructions 510, 520, 530, 540, 550, and 560 that, when executed by processor(s) 514, cause processor(s) 514 to perform various functions. Examples of processor(s) 514 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 516 include tangible media such as random-access memory (RAM), read-only memory (ROM), electrically erasable programmable read-only memory (EEPROM), flash memory, a hard disk drive, etc.

Instructions 510 cause processor(s) 514 to control a radio frequency (RF) receiver (e.g., RF receiver 302) to receive one or more RF signals. The RF signals may include a RF signal of interest and one or more interfering RF signals.

Figure 6:
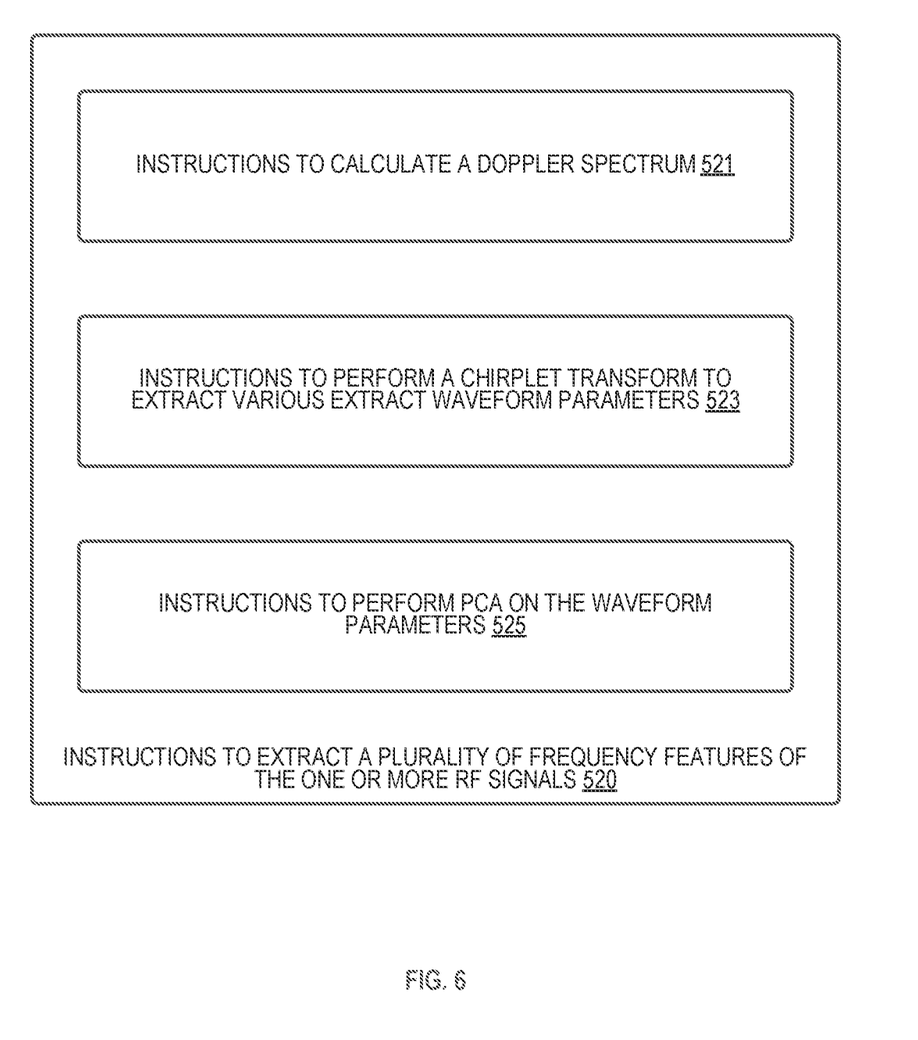
FIG. 6 is a block diagram illustrating example non-transitory computer readable storage medium that may be stored in the processing system illustrated in FIG. 5.

Instructions 520 cause processor(s) 514 to control a feature extraction engine (e.g., feature extraction engine 310) to extract a plurality of frequency features of the RF signals. As illustrated in FIG. 6, instructions 520 may further include instructions 521, 523, and 525. Instructions 521 cause processor(s) 514 to control a spectrum analysis engine (spectrum analysis engine 312) to calculate a Doppler spectrum of each of the received or more RF signals. Instructions 523 cause processor(s) 514 to control a chirplet transform engine 314 to perform a chirplet transform to various extract waveform parameters. Instructions 525 cause processor(s) 514 to control a PCA engine (e.g., PCA engine 316) to perform a PCA on the waveform parameters and extract the frequency features of the RF signals.

Instructions 530 cause processor(s) 514 to control a classifier (e.g., classifier 320) to classify the frequency features of the RF signals into a class corresponding to interfering frequency features and a class corresponding to frequency features of an RF signal of interest.

Instructions 540 cause processor(s) 514 to control a waveform information extractor (e.g., waveform information extractor 330) to extract interfering waveform information of the interfering RF signals.

Instructions 550 cause processor(s) 514 to control a waveform generation circuit (e.g., waveform generation circuit 340) to perform interference mitigation utilizing the interfering waveform information.

Instructions 560 cause a beamforming engine (e.g., beamforming engine 350) to perform beamforming on the RF signal of interest.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 516 has stored thereon data representing sequences of instructions that, when executed by a processor(s) 514, cause the processor(s) 514 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A system comprising:
   a memory system to store processor-executable instructions; and
   one or more hardware processors coupled with the memory system, the one or more hardware processors are configured to:
   receive, via a radio frequency (RF) receiver, one or more RF signals comprising an RF signal of interest and one or more interfering RF signals;
   extract a plurality of frequency features of the one or more RF signals;
   identify, using a classifier, one or more first frequency features of the plurality of frequency features as interfering frequency features of the interfering RF signals;
   extract interfering waveform information based on the interfering frequency features of the interfering RF signals; and
   provide the interfering waveform information to a waveform generator for interference mitigations
   wherein, to extract the plurality of frequency features of the one or more RF signals, the one or more hardware processors are further to:
   calculate a Doppler spectrum of each of the received one or more RF signals; and
   perform a chirplet transform on the Doppler spectrum to generate a plurality of waveform parameters.

2. The system of claim 1, wherein the interfering waveform information comprises phase noise of the one or more interfering RF signals.

3. The system of claim 1, wherein the interfering waveform information comprises at least one of a phase, a frequency change rate, and a bandwidth of the one or more interfering RF signals.

4. The system of claim 1, wherein, to extract the plurality of frequency features of the one or more RF signals, the one or more hardware processors are further to:
   perform a principal component analysis on the waveform parameters, wherein the plurality of frequency features of the one or more RF signals comprises a plurality of principal components of the waveform parameters.

5. The system of claim 1, wherein the waveform parameters comprise at least one of a start frequency, a phase offset, or a chirp rate, or a pulse repetition frequency.

6. The system of claim 1, wherein the one or more hardware processors are further configured to:
   identify, using the classifier, one or more second frequency features of the plurality of frequency features as frequency features associated with the RF signal of interest; and
   performing beamforming utilizing the one or more second frequency features.

7. A non-transitory computer-readable medium having stored thereon instructions that, when executed by one or more processors, are configurable to cause the one or more processors to:
   receive, via a radio frequency (RF) receiver, one or more RF signals comprising an RF signal of interest and one or more interfering RF signals;
   extract a plurality of frequency features of the one or more RF signals;
   identify, using a classifier, one or more first frequency features of the plurality of frequency features as interfering frequency features of the interfering RF signals;
   extract interfering waveform information based on the interfering frequency features of the interfering RF signals; and
   provide the interfering waveform information to a waveform generator for interference mitigation wherein, to extract the plurality of frequency features of the one or more RF signals, the one or more processors are further to:

calculate a Doppler spectrum of each of the received one or more RF signals; and perform a chirplet transform on the Doppler spectrum to generate a plurality of waveform parameters.

8. The non-transitory computer-readable medium of claim 7, wherein the interfering waveform information comprises phase noise of the one or more interfering RF signals.

9. The non-transitory computer-readable medium of claim 7, wherein the interfering waveform information comprises at least one of a phase, a frequency change rate, and a bandwidth of the one or more interfering RF signals.

10. The non-transitory computer-readable medium of claim 7, further comprising instructions that, when executed by the one or more processors, cause the one or more processors to extract the plurality of frequency features of the one or more RF signals by:

performing a principal component analysis on the waveform parameters, wherein the plurality of frequency features of the one or more RF signals comprises a plurality of principal components of the waveform parameters.

11. The non-transitory computer-readable medium of claim 7, wherein the waveform parameters comprise at least one of a start frequency, a phase offset, a chirp rate, or a pulse repetition frequency.

12. A method comprising:

receiving, via a radio frequency (RF) receiver, one or more RF signals comprising an RF signal of interest and one or more interfering RF signals;

extracting, by one or more hardware processors, a plurality of frequency features of the one or more RF signals;

identifying, using a classifier, one or more first frequency features of the plurality of frequency features as interfering frequency features of the interfering RF signals;

extracting interfering waveform information based on the interfering frequency features of the interfering RF signals; and providing the interfering waveform information to a waveform generator for interference mitigation wherein, to extract the plurality of frequency features of the one or more RF signals, the one or more hardware processors are further to:

calculate a Doppler spectrum of each of the received one or more RF signals; and perform a chirplet transform on the Doppler spectrum to generate a plurality of waveform parameters.

13. The method of claim 12, wherein the interfering waveform information comprises phase noise of the one or more interfering RF signals.

14. The method of claim 12, wherein the interfering waveform information comprises at least one of a phase, a frequency change rate, and a bandwidth of the one or more interfering RF signals.

15. The method of claim 12, wherein extracting the plurality of frequency features of the one or more RF signals comprises:

perform a principal component analysis on the waveform parameters, wherein the plurality of frequency features of the one or more RF signals comprises a plurality of principal components of the waveform parameters.

16. The method of claim 12, wherein the waveform parameters comprise at least one of a start frequency, a phase offset, a chirp rate, or a pulse repetition frequency.

17. The method of claim 12, further comprising:

identifying, using the classifier, one or more second frequency features of the plurality of frequency features as frequency features associated with the RF signal of interest; and performing beamforming utilizing the one or more second frequency features.

* * * * *